United States Patent [19]

Matsumura et al.

[11] Patent Number: 4,976,525
[45] Date of Patent: Dec. 11, 1990

[54] PROJECTION LENS SYSTEM FOR PROJECTORS

[75] Inventors: Takeshi Matsumura; Noboru Koizumi, both of Omiya, Japan

[73] Assignee: Fuji Photo Optical Co., Ltd., Omiya, Japan

[21] Appl. No.: 453,841

[22] Filed: Dec. 20, 1989

[30] Foreign Application Priority Data

Mar. 30, 1989 [JP] Japan .................................. 1-76781

[51] Int. Cl.$^5$ ............................................. B29D 11/00
[52] U.S. Cl. ...................................... 350/432; 350/412
[58] Field of Search ................ 350/432, 412, 463, 464

[56] References Cited

U.S. PATENT DOCUMENTS 4,761,063 8/1988 Yoshioka et al. ................... 350/432
4,778,264 10/1988 Matsumura et al. ................ 350/432
4,900,139 2/1990 Kreitzer ............................. 350/412

*Primary Examiner*—Paul M. Dzierzynski
*Attorney, Agent, or Firm*—Oblon, Spivak, McClelland, Maier & Neustadt

[57] ABSTRACT

Described herein is a projection lens system, comprising from the screen side a positive first lens unit of weak power consisting of a plastic meniscus, a positive or negative second lens unit of weak power consisting of a plastic lens element, third and fourth lens units in the form of a cemented glass lens having a positive combined focal length, a positive fifth lens unit of strong power, a positive sixth lens unit of weak power consisting of a plastic lens element, and a negative seventh lens unit having a concave surface on the screen side, each of the first, second, sixth and seventh lens units having at least an aspheric surface, and arranged to satisfy the following conditions $$0.08 < f/f_1 < 0.18 \text{ and} \qquad (1)$$

$$0.01 < |f/f_2| < 0.1 \qquad (2)$$

where $f_1$ and $f_2$ are focal lengths of the first and second lens units and f is the overall focal length of the projection lens system as a whole.

3 Claims, 7 Drawing Sheets

SPHERICAL ABERRATION

ASTIGMATISM

DISTORTION

TRANSVERSE CHROMATIC ABERRATION

PROJECTION LENS SYSTEM FOR PROJECTORS

FIELD OF THE INVENTION

This invention relates to a refracting projection lens system, and more particularly to a refracting projection lens system suitable for use in projection television sets for projecting picture images from a cathode ray tube (CRT) on a large screen.

BACKGROUND OF THE INVENTION

The projection television set has a projection lens system in front of each of blue, green and red cathode ray tubes to project the picture images from the respective cathode ray tubes on a screen which is located forward of the projection lens system, thereby forming color pictures on the screen.

The projection lens systems to be used in such projection television sets employ glass or plastic lens elements. In the projection lens system of this sort, it has been generally considered that positive correction of chromatic aberration is unnecessary in view of the narrow width of emission spectrum of the fluorescent material. However, recently there is a strong demand for projection lenses capable of correcting chromatic aberration to a sufficient degree to cope with the trend toward high quality pictures, particularly for high resolution projection lenses for use with a large screen or a high definition display.

In this connection, in a case where the lens components of a projection lens system are all made of plastic, the correction of monochromatic aberration is possible by using aspheric lenses which can be easily formed by injection molding. However, in the current state of the art which permits only a narrow freedom in selecting the plastic lens material, there are still problems such as insufficient correction of chromatic aberration and shifts of imaging point which occur to an objectionable degree under varying temperature condition as a result of changes in the refractive index of the plastic which has large thermal coefficient and linear expansion coefficient. Conversely, the correction of chromatic aberration as well as the correction for the shift of imaging point with temperature is easy in a case where the lens components are all made of glass lenses, but it is necessary to employ six or seven lens elements in order to correct the various aberrations while ensuring high quality picture. This is, however, extremely disadvantageous in terms of cost and weight.

In this connection, there has been proposed the so-called hybrid type projection lens using a combination of plastic and glass lenses, for example, as described in U.S. Pat. No. 4,761,063. This prior art projection lens system is composed of five lens units each consisting of a single lens element, consisting of, from the screen side, a positive first lens, a negative second lens, a positive third lens, a positive fourth lens, and a negative fifth lens, of which the third lens is of glass, the first, fourth and fifth lenses are of acrylic, and the second lens is of polystyrene. This arrangement employs a positive acrylic lens for the first lens and a negative polystyrene lens for the second lens in an attempt to correct the chromatic aberration as well as the shift of imaging point with temperature, utilizing the differences in temperature dependent variations of Abbe number and refractive index between the two kinds of plastic lenses.

A lens system of such a construction, in addition to the reduction of the number of glass lens which is disadvantageous weight- and cost-wise, can contribute to some extent to the correction of chromatic aberration and improvement of the shift of imaging point with temperature. However, simply using the first and second lenses of different materials has a limit in correcting the chromatic aberration and the shift of imaging point with temperature, and cannot correct the shift of imaging point caused by components other than lenss, for example, by thermal expansion of the lens barrel or the like, coupled with insufficiency of corrections for errors other than the chromatic aberration. Therefore, it is still far from replying to the demands for high quality pictures as a wide screen projection lens or a high resolution projection lens for high definition television. Further, of the plastic lenses except the fifth lens which is located most closely to CRT, the first, second and fourth lenses which are allotted with a certain degree of lens power have a large difference in thickness between center and peripheral lens portions. These plastic lenses of this sort are normally manufactured by injection molding, but such a large difference in thickness hinders improvements in lens accuracy. Namely, due to the large difference in thickness, non-uniform contraction is like to occur in the cooling stage subsequent to the injection molding, resulting in distortion of the lens structure.

SUMMARY OF THE INVENTION

In view of the foregoing situations, the present invention has as its object the provision of a projection lens system of the hybrid type with a combination of glass and plastic lenses, which can ensure pictures of extremely high quality by the use of a reduced number of glass lenses.

It is another object of the present invention to provide a projection lens system which is reduced in weight and temperature dependent variations of picture quality, and capable of correcting chromatic and other various aberrations to a satisfactory degree.

For achieving the foregoing objectives, the projection lens system of the invention is provided with, from the screen side, a positive first lens unit of weak power consisting of a plastic meniscus, a positive or negative second lens unit of weak power consisting of a plastic lens element, third and fourth lenses in the form of a cemented glass lens having a positive combined focal length, a positive fifth lens unit of strong power, a positive sixth lens unit of weak power consisting of a plastic lens element, and a negative seventh lens unit having a concave surface on the screen side, each of the first, second, sixth and seventh lens units having at least an aspheric surface, and arranged to satisfy the following conditions $$0.08 < f/f_1 < 0.18 \text{ and} \qquad (1)$$

$$0.01 < |f/f_2| < 0.1 \qquad (2)$$

where $f_1$ and $f_2$ are focal lengths of the first and second lens units, respectively, and f is the overall focal length of the projection lens system as a whole.

The above and other objects, features and advantages of the invention will become apparent from the following description of preferred embodiments given in reference to the accompanying drawings, which are shown by way of example and, needless to say, should not be construed as limitative of the invention.

DESCRIPTION OF THE PREFERRED EMBODIMENTS

Figure 1:
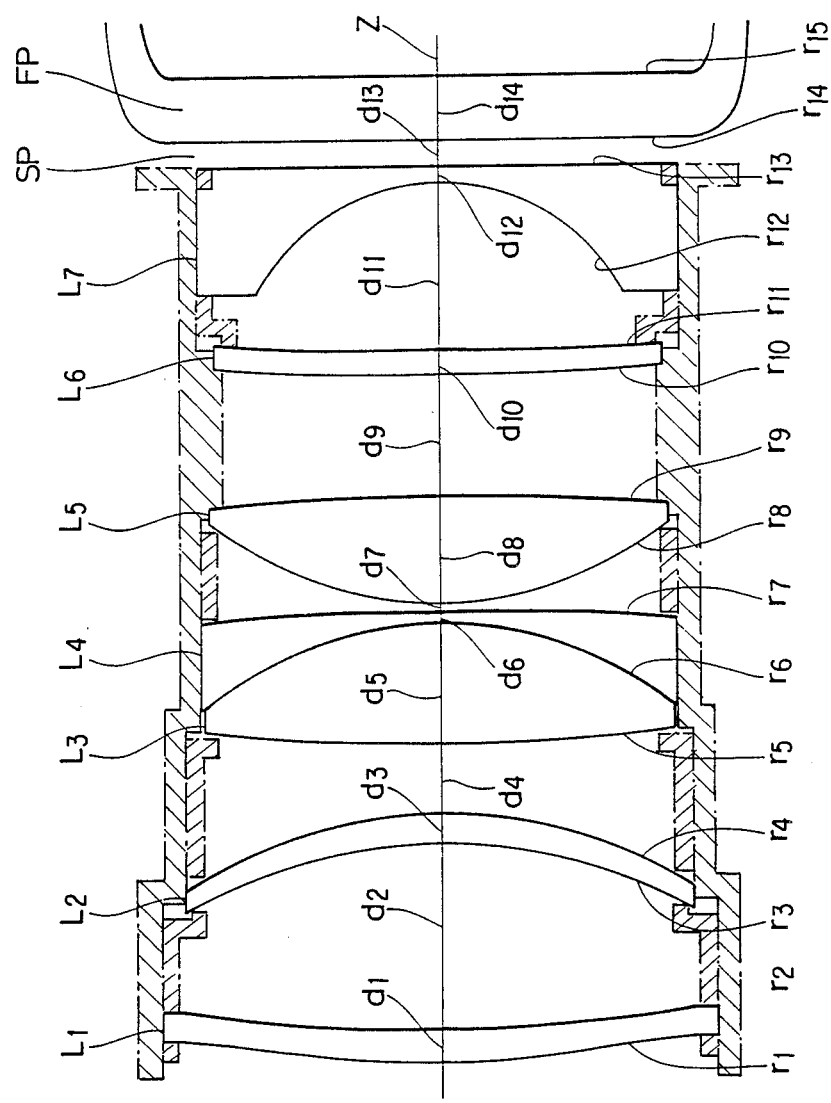
FIG. 1 is a schematic view exemplifying a construction of the projection lens system according to the present invention.
Figure 2:
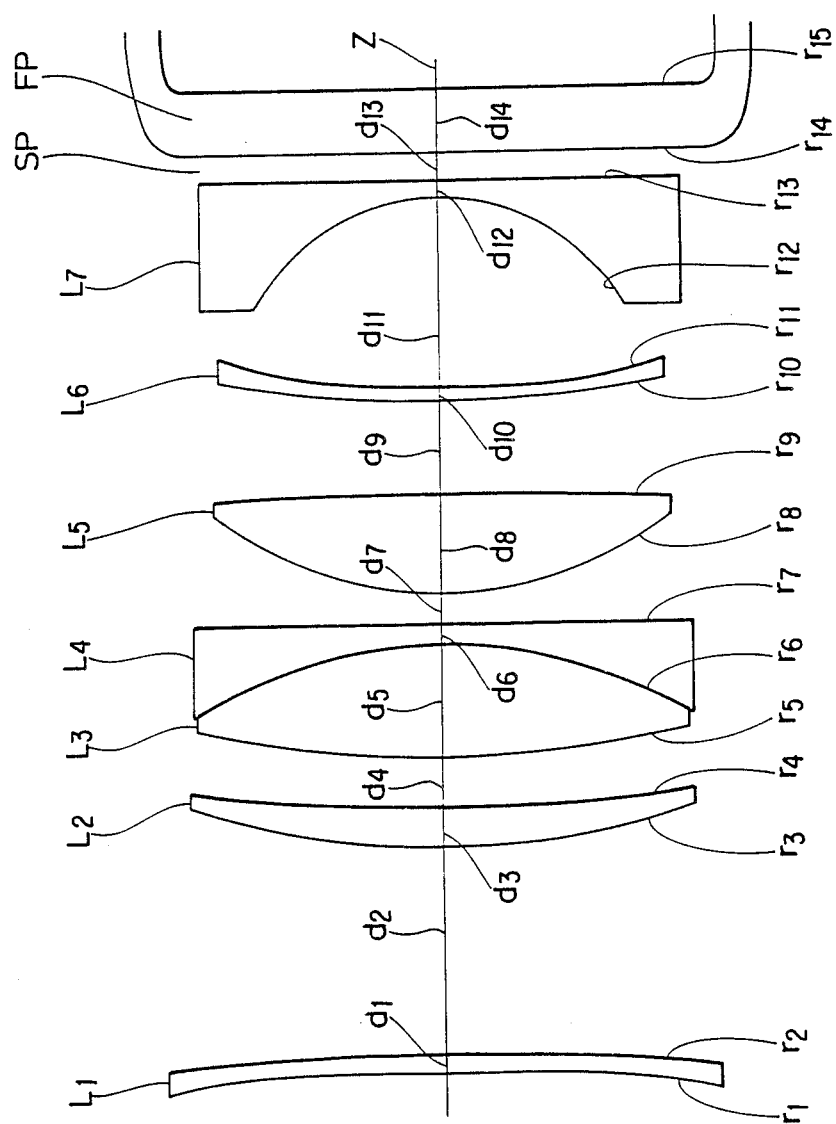
FIG. 2 is a view similar to FIG. 1 but showing a modified construction of the projection lens system of the invention.
Figure 3A:
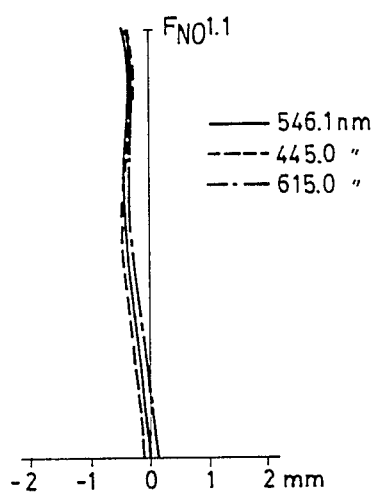
FIGS. 3a, 3b, 3c, 3d, 4a, 4b, 4c, 4d, 5a, 5b, 5c, 5d, 6a, 6b, 6c and 6d are aberration diagrams for the first to fourth embodiments of the invention, respectively.
Figure 3B:
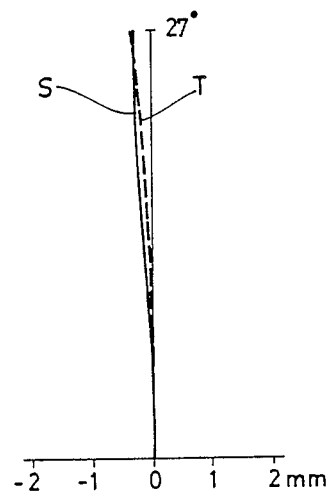
Figure 3C:
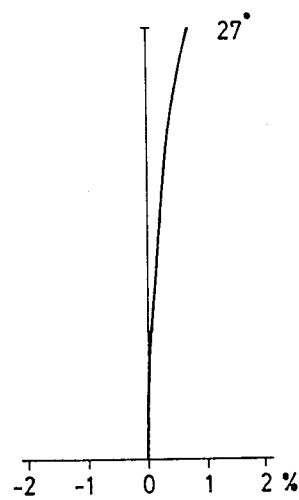
Figure 3D:
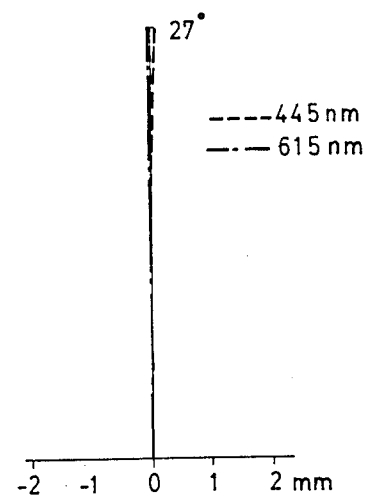
Figure 4A:
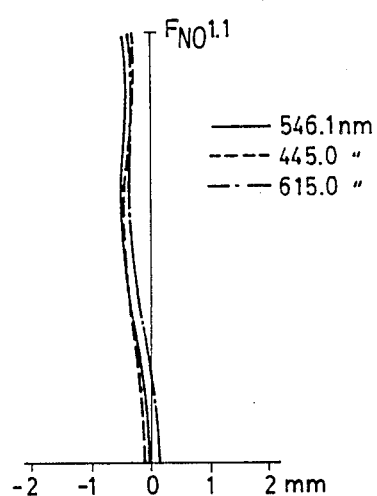
Figure 4B:
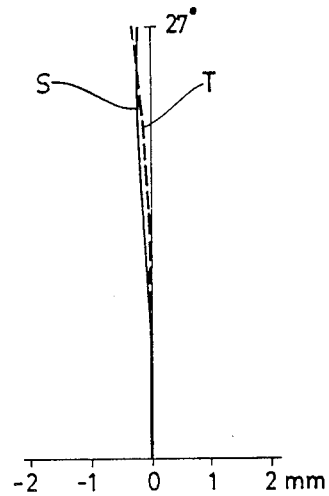
Figure 4C:
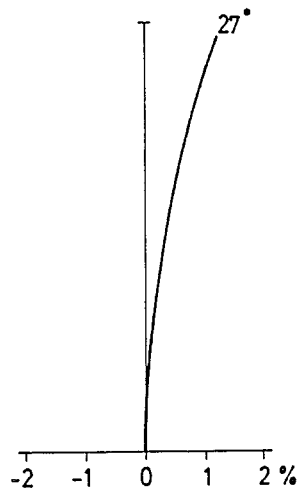
Figure 4D:
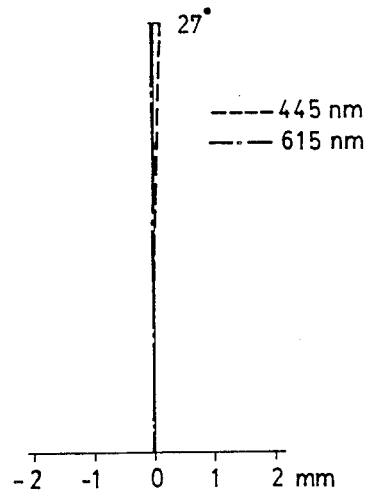
Figure 5A:
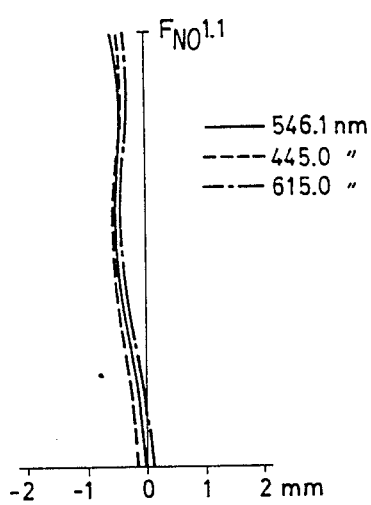
Figure 5B:
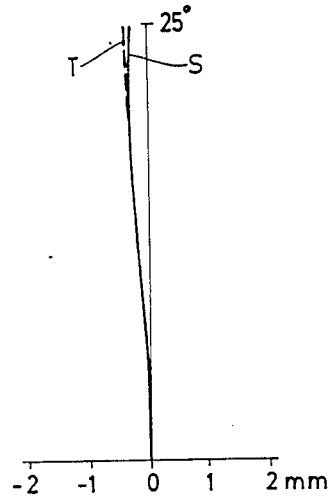
Figure 5C:
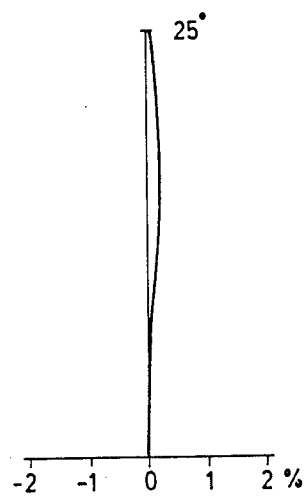
Figure 5D:
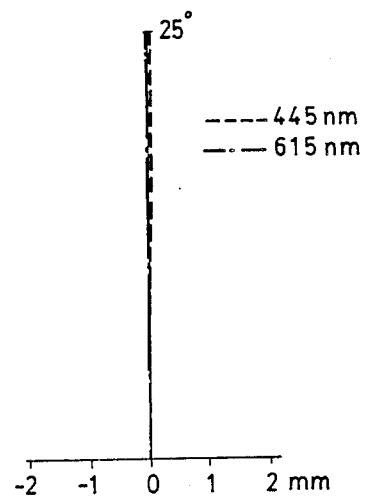
Figure 6A:
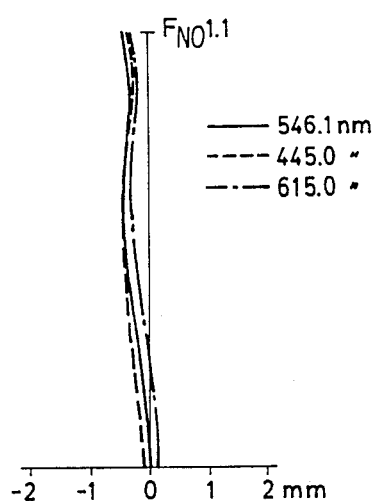
Figure 6B:
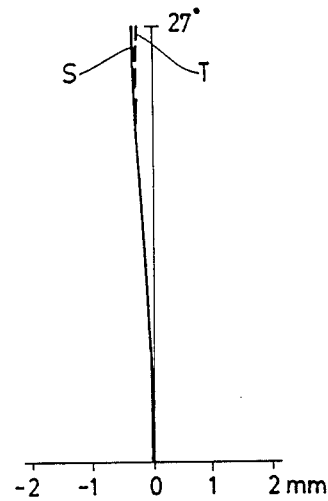
Figure 6C:
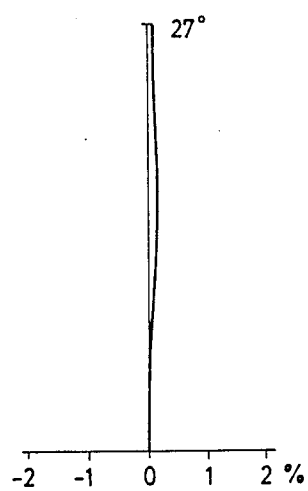
Figure 6D:
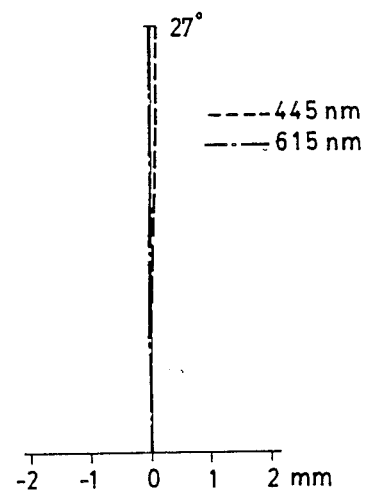
Figure 7A:
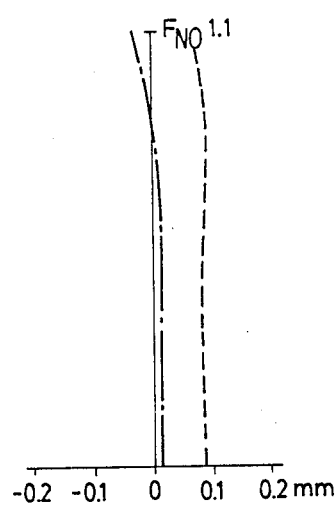
FIGS. 7a, 7b, 7c and 7d are spherical aberration diagrams at the wavelength of 546.1 nm in the first to fourth embodiments of the invention, plotted against temperature variations of +40° from a norm level of 20°
Figure 7B:
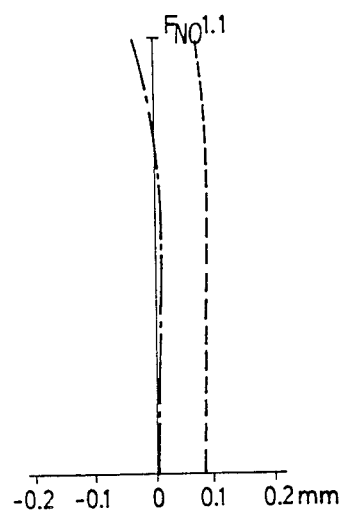
Figure 7C:
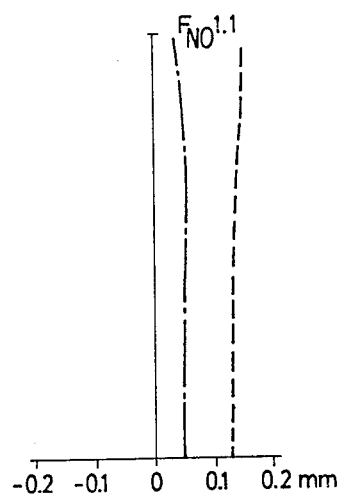
Figure 7D:
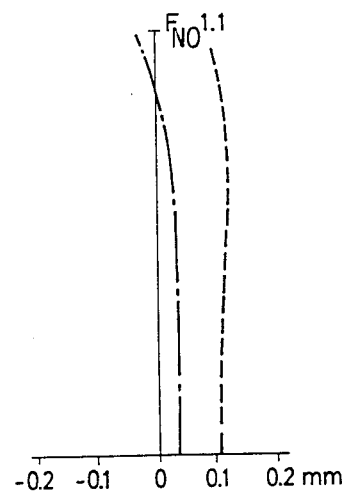

Hereafter, the invention is described more particularly by way of preferred embodiments with reference to the accompanying drawings. Illustrated in FIG. 1 is a lens construction employed in the first to third embodiments, and in FIG. 2 is a lens construction employed in the fourth embodiment of the projection lens system according to the invention.

In these figures, denoted at $L_1$ to $L_7$ are first to seventh lens units. The first lens unit $L_1$ consists of a weak positive meniscus lens of plastic, and the second lens unit $L_2$ consists of a weak plastic lens element. The third and fourth lens units $L_3$ and $L_4$ are in the form of a cemented lens, the lens unit $L_3$ being of a positive glass lens element while the fourth lens $L_4$ is of a negative glass lens element. The fifth lens unit $L_5$ consists of a strong positive lens element. The sixth lens $L_6$ is of a weak positive lens element of plastic, and the seventh lens $L_7$ is of a negative plastic lens element.

The reference SP indicates a spacing which is filled with air or a liquid. FP denote the faceplate of the CRT. Indicated at r is the radius of curvature of a lens surface or the faceplate FP, and at d is the thickness at the optical axis of a lens or the faceplate FP or the width of an air space, each labelled with a subscript of serial number from the screen side. Indicated at 14 and 15 are exterior and interior surfaces of the faceplate FP (the surface 15 corresponding to the fluorescent surface of the CRT).

The first lens unit $L_1$ is constituted by a positive meniscus having surfaces convex to the screen (in the lens construction of FIG. 1) or concave to the screen (in the lens construction of FIG. 2) and having at least one of the surfaces formed aspheric, and contributes to corrections of various aberrations and especially to correction of sagittal coma aberration.

The second lens unit $L_2$ is constituted by a positive or negative meniscus having surfaces concave to the screen (in the construction of FIG. 1) or convex to the screen (in the construction of FIG. 2), and having at least one of the surfaces formed aspheric. Accordingly, this lens serves for correction of spherical aberration and the residual aberration which still exists after correction by the first lens $L_1$.

The cemented lens which is constituted by the third and fourth lens units $L_3$ and $L_4$ has a positive overall focal length and serves for correction of chromatic aberration.

The fifth lens unit $L_5$ which is constituted by a positive glass lens element with convex surfaces is allotted with the main power of the projection lens system as a whole to suppress the shift of focus with temperature to a minimum.

The sixth lens unit $L_5$ is constituted by a weak positive plastic lens having at least one aspheric surface, and contributes to the correction of residual aberrations after the third to fifth lenses $L_3$ to $L_5$ and at the same time to the correction of tangential coma aberration.

The seventh lens unit $L_7$ is constituted by a negative plastic lens element having a concave surface with a larger radius of curvature on the screen side and having at least one aspheric surface to correct curvature of field. The seventh lens $L_7$ may be a plastic meniscus lens element which is coupled with the CRT faceplate FP through a liquid which is filled between the seventh lens $L_7$ and the faceplate FP.

In the above-described construction, the first, second and sixth lenses $L_1$, $L_2$ and $L_6$ of plastic are each allotted with a weak lens power to hold the shift of imaging point with temperature to a minimum, while the fifth lens $L_5$ consisting of a single glass lens element is allotted with the main lens power to make the temperature dependent shift of imaging point as small as possible and facilitate corrections in this regard. The use of plastic lenses of weak power, with a smaller degree of variation in lens thickness, has an advantage that the contraction of lens bodies occurs uniformly and free of distortion in a cooling stage subsequent to injection molding, providing lenses of higher accuracy. By allotting the main power to the fifth lens $L_5$ in this manner, the influences of thermal expansion or contraction of the lens-supporting barrel can be suitably absorbed on the part of the lens system. Accordingly, despite the influence of temperature variations, it becomes possible to fabricate the lens barrel out of an inexpensive and light-weight plastic material.

With regard to the functions of correcting aberrations, the correction for chromatic aberration is performed by the third and fourth lens units $L_3$ and $L_4$ of the cemented lens more easily than plastic lenses, while corrections for other aberrations such as coma, spherical and field curvature are performed by the plastic lens elements of the first, second, sixth and seventh lenses $L_1$, $L_2$, $L_5$ and $L_7$. Further, distortion is effectively corrected by providing at least an aspheric surface on one side of these lenses $L_1$, $L_2$, $L_5$ and $L_7$. An aspheric surface can be formed easily on these plastic lenses by injection molding of a synthetic resin material such as polymethyl methacrylate, polycarbonate or the like, while attaining a significant reduction in weight of the lens system as a whole.

For the purpose of transmitting as much the light from the CRT as possible, the F number of the projection lens system is set at around 1.1 to ensure high image intensity. However, such a high image intensity lens involves aberrations of higher order, which would require an increased number of lenses for correction if spherical lenses alone were used. However, by using aspheric lenses as mentioned hereinbefore, the aberrations of higher order can be corrected optimally even with use of a reduced number of lenses.

More specifically, the above-described lens construction is arranged to satisfy the conditions of $$0.08 < f/f_1 < 0.18 \text{ and} \tag{1}$$

$$0.01 < |f/f_2| < 0.1 \quad (2)$$

where $f_1$ and $f_2$ are focal lengths of the first and second lenses, respectively, and f is the overall focal length of the system as a whole.

The conditional formula (1) defines the power of the first lens $L_1$. When in excess of the upper limit, it becomes difficult to correct astigmatism and coma to a sufficient degree, resulting in drops in contrast and resolution in addition to a difficulty of obtaining a wide angle of field. On the other hand, when below the lower limit, the first lens $L_1$ is too weak in power and forms a diverging lens, imparting diverging tendency to the light from the lens $L_1$. This makes it necessary to use lenses of larger diameters for the second lens $L_2$ and those lenses following after, spoiling the intended reduction in weight.

The conditional formula (2) defines the power of the second lens $L_2$. When in excess of the upper limit, coma aberration occurs to intermediate portions of the angle of field, lowering the resolution. On the other hand, when below the lower limit, the second lens $L_2$ will become too weak in power and fail to correct the spherical aberration satisfactorily.

When both of the first and second lenses $L_1$ and $L_2$ are outside the ranges of the conditions (1) and (2), the shift of imaging point with temperature will occur in an increased degree which is difficult to correct. Besides, in the process of fabricating lenses, the large difference in thickness between the center and peripheral portions of the lenses can be a hindrance to the enhancement of the lens machining accuracy.

Further, more favorable results can be obtained by meeting the following condition (3) in addition to the afore-mentioned conditions (1) and (2).

$$0.3 < d_{1+2+3+4}/d < 0.4 \quad (3)$$

where $d_{1+2+3+4}$ is the sum of on-axis spacings from the screen side surface of the first lens $L_1$ to the screen side surface of the third lens $L_3$, and d is the sum of on-axis spacings from the screen side surface of the first lens $L_1$ to the CRT side surface of the seventh lens $L_7$.

The conditional formula (3) defines the ratio of the sum of the on-axis spacings between screen side surfaces of the first and third lenses $L_1$ and $L_3$ to the total on-axis length of the lens system. If greater than the upper limit, the total on-axis length of the lens system is increased to such a degree as to decrease relative illumination in peripheral portions. In order to increase the relative illumination in peripheral portions, it becomes necessary to employ a first lens $L_1$ of a larger outer diameter, at the sacrifice of the compactness of the lens construction. On the other hand, if smaller than the lower limit of the condition (3), the power of the first lens $L_1$ becomes too large, resulting in a deteriorated resolution due to insufficient correction of spherical aberration and occurrence of sagittal coma aberration.

When shifting the lens system for adjustment of focus or for alteration of magnification ratio for projection, the second to seventh lenses units $L_2$ to $L_7$ are integrally shifted along the optical axis in the first place in a case where the spacing SP is not filled with a liquid, and then the first lens $L_1$ alone is separately shifted along the optical axis for adjustment of the image surface. Where the spacing SP is filled with a liquid, the seventh lens $L_7$ is fixed, so that the second to sixth lenses $L_2$ to $L_6$ are integrally shifted along the optical axis in the first place, followed by a shift of the first lens $L_1$ alone for the adjustment of the image surface.

Illustrated below are four embodiments of the invention, in which:

f: focal length of the projection lens,
Fno: F number,
m: serial surface numbers from the screen side,
$r_1, r_2, \ldots r_{15}$: radii of curvature of the lens and faceplate, surfaces,
$d_1, d_2, \ldots d_{14}$: on-axis thickness or widths of the respective lenses and air spaces,
$n_1, n_2, \ldots n_3$: indices of refraction of the respective lenses for line e,
$\nu_1, \nu_2, \ldots \nu_7$: Abbe numbers of the respective lenses.

An aspheric surface is indicated by an asterisk * and, on the basis of Z- and y-axes which extend in the direction of the optical axis and a direction perpendicular to the optical axis, respectively, its shape is expressed as $$Z = cy^2/[1 + \sqrt{1 - (1 + K) c^2 y^2}] + a_1 y^4 + a_2 y^6 + a_3 y^8 + a_4 y^{10}$$

where c is the radius of curvature at the optical axis, K is the eccentricity and $a_1$ to $a_4$ are aspheric coefficients.

| Embodiment 1 | | | | |
|---|---|---|---|---|
| f = 100 mm Fno = 1.10 Magnification = 22.7 | | | | |
| m | r | d | n | ν |
| 1* | 178.42 | 6.43 | 1.49217 | 57.2 |
| 2* | 428.57 | 35.19 | | |
| 3* | −96.430 | 5.71 | 1.49217 | 57.2 |
| 4* | −95.664 | 13.33 | | |
| 5 | 394.30 | 22.64 | 1.59143 | 61.2 |
| 6 | −72.150 | 2.50 | 1.72311 | 29.5 |
| 7 | −642.64 | 1.50 | | |
| 8 | 69.686 | 20.29 | 1.59143 | 61.2 |
| 9 | −751.86 | 24.04 | | |
| 10 | 636.07 | 5.00 | 1.49217 | 57.2 |
| 11* | −587.77 | 31.97 | | |
| 12* | −39.477 | 3.00 | 1.49217 | 57.2 |
| 13(SP) | ∞ | 3.76 | | |
| 14(FP) | ∞ | 12.19 | 1.54000 | |
| 15 | ∞ | | | |
| $f/f_1$ = 0.162 | | | | |
| $|f/f_2|$ = 0.014 | | | | |
| $d_{1+2+3+4}/d$ = 0.354 | | | | |
| Aspheric Coefficients | | | | |

| | Surface 1 | Surface 2 |
|---|---|---|
| K | −2.17151 × 10⁻¹ | 2.56100 × 10⁻⁴ |
| $a_1$ | −2.08279 × 10⁻⁷ | 1.54313 × 10⁻⁷ |
| $a_2$ | −2.32426 × 10⁻¹¹ | 5.00183 × 10⁻¹² |
| $a_3$ | −6.73328 × 10⁻¹⁵ | −4.56280 × 10⁻¹⁵ |
| $a_4$ | −4.10774 × 10⁻¹⁸ | −3.63887 × 10⁻¹⁹ |
| | Surface 3 | Surface 4 |
| K | 2.69030 × 10⁻³ | 1.94803 × 10⁻² |
| $a_1$ | 2.38347 × 10⁻⁷ | −1.46120 × 10⁻⁷ |
| $a_2$ | −9.12015 × 10⁻¹¹ | −5.43556 × 10⁻¹² |
| $a_3$ | 5.46568 × 10⁻¹⁴ | 9.50480 × 10⁻¹⁵ |
| $a_4$ | −3.68011 × 10⁻¹⁸ | 1.27981 × 10⁻¹⁸ |
| | Surface 11 | Surface 12 |
| K | −1.35108 × 10⁻² | −7.58191 × 10⁻³ |
| $a_1$ | 8.36018 × 10⁻⁷ | 9.41042 × 10⁻⁷ |
| $a_2$ | −9.68640 × 10⁻¹¹ | 5.0000 × 10⁻¹⁰ |
| $a_3$ | 3.42831 × 10⁻¹³ | 1.02137 × 10⁻¹² |
| $a_4$ | −2.38327 × 10⁻¹⁶ | −4.45000 × 10⁻¹⁶ |

| Embodiment 2 | | | | |
|---|---|---|---|---|
| f = 100 mm Fno = 1.10 Magnification = 22.6 | | | | |
| m | r | d | n | ν |

-continued

Embodiment 2

| m | r | d | n | ν |
|---|---|---|---|---|
| 1* | 213.21 | 6.43 | 1.49953 | 56.1 |
| 2 | 892.86 | 31.93 | | |
| 3* | −96.444 | 5.71 | 1.49953 | 56.1 |
| 4 | −99.207 | 14.30 | | |
| 5 | 394.30 | 22.64 | 1.59143 | 61.2 |
| 6 | −72.150 | 2.50 | 1.72311 | 29.5 |
| 7 | −642.64 | 1.50 | | |
| 8 | 69.686 | 20.29 | 1.59143 | 61.2 |
| 9 | −751.857 | 24.04 | | |
| 10 | 636.07 | 5.00 | 1.49953 | 56.1 |
| 11* | −587.77 | 31.97 | | |
| 12* | −39.576 | 3.0 | 1.49217 | 57.2 |
| 13(SP) | ∞ | 3.79 | | |
| 14(FP) | ∞ | 12.19 | 1.54000 | |
| 15 | ∞ | | | |

$f/f_1 = 0.179$
$|f/f_2| = 0.0044$
$d_{1+2+3+4}/d = 0.345$
Aspheric Coefficients

| | Surface 1 | Surface 2 |
|---|---|---|
| K | $-2.21333 \times 10^{-1}$ | $-1.47879 \times 10^{-2}$ |
| $a_1$ | $-3.84252 \times 10^{-7}$ | $4.54389 \times 10^{-7}$ |
| $a_2$ | $-2.09954 \times 10^{-11}$ | $9.43218 \times 10^{-11}$ |
| $a_3$ | $-9.24327 \times 10^{-15}$ | $4.75584 \times 10^{-14}$ |
| $a_4$ | $-9.51486 \times 10^{-19}$ | $-6.68362 \times 10^{-18}$ |
| | Surface 11 | Surface 12 |
| K | $-1.35108 \times 10^{-2}$ | $4.19686 \times 10^{-3}$ |
| $a_1$ | $8.36081 \times 10^{-7}$ | $7.99690 \times 10^{-7}$ |
| $a_2$ | $-9.68640 \times 10^{-11}$ | $-5.70252 \times 10^{-10}$ |
| $a_3$ | $3.42831 \times 10^{-13}$ | $1.03149 \times 10^{-12}$ |
| $a_4$ | $-2.38327 \times 10^{-16}$ | $-3.95263 \times 10^{-16}$ |

Embodiment 3 f = 100 mm Fno = 1.10 Magnification = 17.3

| m | r | d | n | ν |
|---|---|---|---|---|
| 1* | 166.10 | 6.43 | 1.49217 | 57.2 |
| 2* | 365.38 | 26.85 | | |
| 3* | −143.09 | 5.71 | 1.49217 | 57.2 |
| 4* | −121.46 | 11.02 | | |
| 5 | 553.29 | 22.64 | 1.59143 | 61.2 |
| 6 | −72.75 | 2.50 | 1.72311 | 29.5 |
| 7 | −644.49 | 6.27 | | |
| 8 | 69.741 | 20.29 | 1.59143 | 61.2 |
| 9 | −748.90 | 24.09 | | |
| 10 | 640.68 | 5.00 | 1.49217 | 57.2 |
| 11* | −492.16 | 30.50 | | |
| 12* | −40.355 | 3.0 | 1.49217 | 57.2 |
| 13(SP) | ∞ | 13.51 | 1.443 | |
| 14(FP) | ∞ | 5.86 | 1.54000 | |
| 15 | −1780.00 | | | |

In this case, the spacing SP is filled with a liquid of a refractive index of 1.443.

$f/f_1 = 0.163$
$|f/f_2| = 0.067$
$d_{1+2+3+4}/d = 0.304$
Aspheric Coefficients

| | Surface 1 | Surface 2 |
|---|---|---|
| K | $-2.20025 \times 10^{-1}$ | $3.09900 \times 10^{-4}$ |
| $a_1$ | $-2.81464 \times 10^{-7}$ | $1.69319 \times 10^{-7}$ |
| $a_2$ | $-3.47221 \times 10^{-11}$ | $2.53737 \times 10^{-11}$ |
| $a_3$ | $-7.12764 \times 10^{-15}$ | $-3.89638 \times 10^{-15}$ |
| $a_4$ | $-4.12087 \times 10^{-18}$ | $-3.39891 \times 10^{-19}$ |
| | Surface 3 | Surface 4 |
| K | $4.38200 \times 10^{-3}$ | $5.71574 \times 10^{-2}$ |
| $a_1$ | $2.29074 \times 10^{-7}$ | $-2.35374 \times 10^{-7}$ |
| $a_2$ | $-9.78733 \times 10^{-11}$ | $-2.75920 \times 10^{-11}$ |
| $a_3$ | $5.47736 \times 10^{-14}$ | $8.79905 \times 10^{-15}$ |
| $a_4$ | $-3.69366 \times 10^{-18}$ | $1.28649 \times 10^{-18}$ |
| | Surface 11 | Surface 12 |
| K | $-1.34760 \times 10^{-2}$ | $1.35409 \times 10^{-2}$ |
| $a_1$ | $7.86430 \times 10^{-7}$ | $7.19052 \times 10^{-7}$ |
| $a_2$ | $-9.78588 \times 10^{-11}$ | $-5.94722 \times 10^{-10}$ |
| $a_3$ | $3.43015 \times 10^{-13}$ | $1.02119 \times 10^{-12}$ |
| $a_4$ | $-2.38324 \times 10^{-16}$ | $-4.05186 \times 10^{-16}$ |

Embodiment 4 f = 100 mm Fno = 1.10 Magnification = 18.9

| m | r | d | n | ν |
|---|---|---|---|---|
| 1* | −14285.7 | 3.57 | 1.49217 | 57.2 |
| 2 | −571.43 | 39.32 | | |
| 3* | 217.59 | 7.14 | 1.49217 | 57.2 |
| 4 | 375.94 | 9.77 | | |
| 5 | 208.85 | 22.64 | 1.59143 | 61.2 |
| 6 | −85.036 | 2.50 | 1.72311 | 29.5 |
| 7 | 1785.7 | 5.21 | | |
| 8 | 67.116 | 20.29 | 1.59143 | 61.2 |
| 9 | −1098.90 | 17.78 | | |
| 10 | 240.81 | 2.64 | 1.49217 | 57.2 |
| 11* | 502.77 | 37.07 | | |
| 12* | −36.573 | 3.0 | 1.49217 | 57.2 |
| 13(SP) | ∞ | 4.64 | | |
| 14(FP) | ∞ | 12.14 | 1.54000 | |
| 15 | ∞ | | | |

$f/f_1 = 0.083$
$|f/f_2| = 0.097$
$d_{1+2+3+4}/d = 0.349$
Aspheric Coefficients

| | Surface 1 | Surface 2 |
|---|---|---|
| K | $-2.21211 \times 10^{-1}$ | $-3.27266 \times 10^{-3}$ |
| $a_1$ | $-4.60253 \times 10^{-7}$ | $5.13439 \times 10^{-7}$ |
| $a_2$ | $1.80221 \times 10^{-11}$ | $-8.80387 \times 10^{-11}$ |
| $a_3$ | $-1.37957 \times 10^{-15}$ | $1.92314 \times 10^{-14}$ |
| $a_4$ | $-2.24295 \times 10^{-19}$ | $-2.83344 \times 10^{-18}$ |
| | Surface 11 | Surface 12 |
| K | $-1.26443 \times 10^{-2}$ | $-3.93290 \times 10^{-2}$ |
| $a_1$ | $1.07200 \times 10^{-6}$ | $7.64942 \times 10^{-7}$ |
| $a_2$ | $-4.88974 \times 10^{-11}$ | $-3.31122 \times 10^{-10}$ |
| $a_3$ | $3.45675 \times 10^{-13}$ | $7.64502 \times 10^{-13}$ |
| $a_4$ | $-1.90975 \times 10^{-16}$ | $-2.46459 \times 10^{-16}$ |

Shown in FIGS. 3 to 6 are diagrams of various aberrations calculated on the basis of the figures of Embodiments 1 to 4, all accounting for the faceplate FP.

FIG. 7 is diagrams of spherical aberrations at the wavelength of 546.1 nm in Embodiments 1 to 4 under conditions where the temperature is varied over a range of +40° from a norm level of 20°. In FIG. 7, the broken line indicates a case of temperature changes of lenses alone and the dot-and-dash line indicates a case of temperature changes of both lenses and lens barrel.

What is claimed is:

1. A projection lens system, comprising from a screen side a positive first lens unit of weak power consisting of a plastic meniscus, a second lens unit of weak power consisting of a plastic lens element, third and fourth lens units in the form of a cemented glass lens having a positive combined focal length, a positive fifth lens unit of strong power, a positive sixth lens unit of weak power consisting of a plastic lens element, and a negative seventh lens unit having a concave surface on the screen side, each of said first, second, sixth and seventh lens units having at least an aspheric surface, and arranged to satisfy the following conditions $$0.08 < f/f_1 < 0.18 \text{ and} \quad (1)$$

$$0.01 < |f/f_2| < 0.1 \quad (2)$$

where $f_1$ and $f_2$ are focal lengths of said first and second lens units and f is the overall focal length of said projection lens system as a whole.

2. A projection lens system as defined in claim 1, further satisfying the condition of $$0.3 < d_{1+2+3+4}/d < 0.4 \quad (3)$$

$d_{1+2+3+4}$ is the sum of on-axis spacings between the screen side surfaces of said first and third lens units and d is the sum of on-axis spacings between the screen side surface of said first lens unit and a CRT side surface of said seventh lens unit.

3. A projection lens system as defined in claim 1 or 2, wherein said lens units are supported by a lens barrel of a synthetic resin material.

* * * * *